A. W. Hale,
Meat Mincer.

No. 2,136. Reissued Dec. 26, 1865.

Witnesses:

Alex M. Hard
L. A. Ward

Inventor:

Albert W. Hale

N. PETERS, PHOTO-LITHOGRAPHER, WASHINGTON, D. C.

UNITED STATES PATENT OFFICE.

ALBERT W. HALE, OF NEW YORK, N. Y.

MEAT-MINCER.

Specification forming part of Letters Patent No. 23,246, dated March 15, 1859; Reissue No. 2,136, dated December 26, 1865.

*To all whom it may concern:*

Be it known that I, ALBERT W. HALE, of the city and State of New York, formerly of New Britain, in the State of Connecticut, have invented a new and Improved Machine for Cutting or Mincing Meat, Vegetables, &c.; and I do hereby declare that the following is a full, clear, and exact description thereof, reference being had to the accompanying drawings, and to the letters of reference marked thereon, and making a part of this specification.

The nature of my invention consists generally in the arrangement and use of one or more grooved cylinders or rollers revolving in a grooved or ribbed case and acting against a stationary knife, whereby I produce a machine economical and simple in construction, not liable to get out of order, and which can be easily kept sweet and clean for use.

Figure 3:
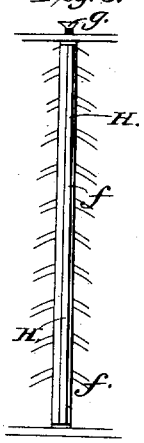
Figure 1:
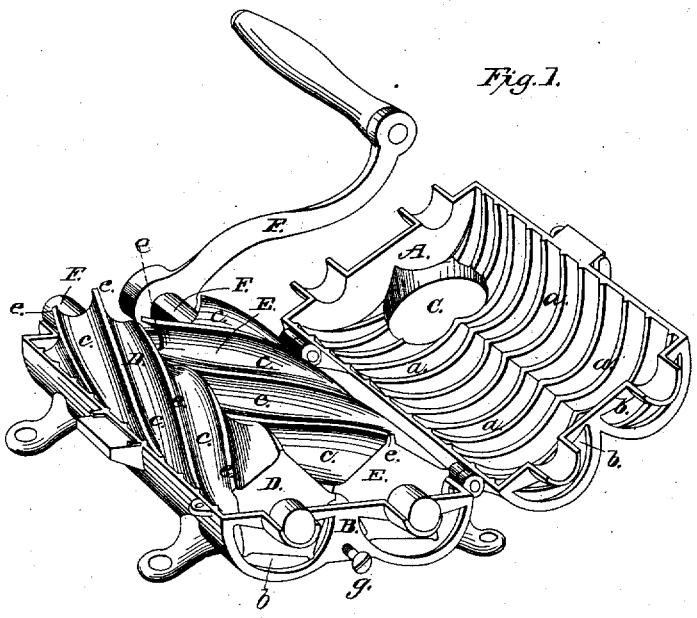
Figure 5:
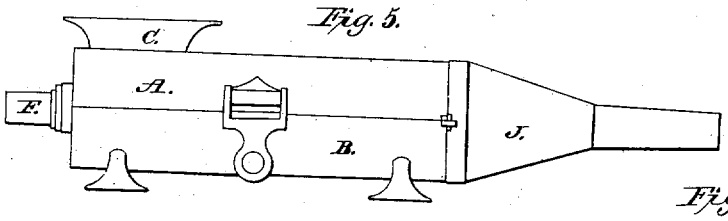
Figure 4:
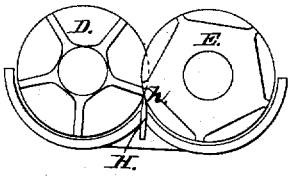
Figure 2:
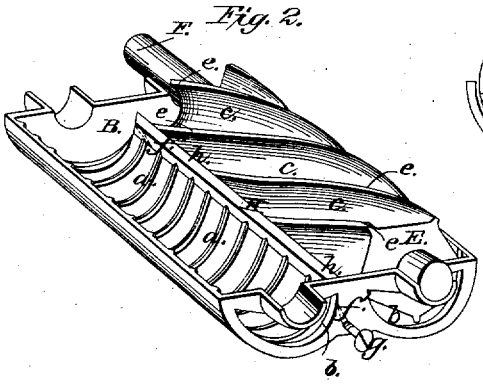
Figure 6:
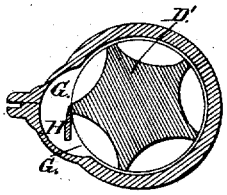

Figure 1 is a perspective view, the upper case being removed or open, showing the construction of the case, the position of the grooved cylinders or rollers, and also the place of discharge of the minced article. Fig. 2 is a view of the lower case, one cylinder being removed, showing the position of the knife, and also the construction of the lower case or cylinder-bed. Fig. 3 is a view of that portion of the lower case holding the knife. Fig. 4 is an end view of the cylinders and knife in position, one cylinder being changed end for end, so as to show both the greatest and shallowest depth of the grooves. Fig. 5 is a side view of the machine with a stuffer attached. Fig. 6 is a sectional view of the machine with a single cylinder instead of two.

The upper and lower cases, A and B, are constructed or fitted with ribs or projections *a a*, Figs. 1, 2, upon their inner concave surfaces, which form, when the cases are in position or closed, a continuous spiral rib or screw, inclining forward and toward the orifices *b b*, at which the minced article is discharged. These ribs *a a* may have any angle or inclination, more or less, as preferred and as desired to have the meat, &c., pass slower or faster through the machine; but I generally prefer to give them such an inclination that in passing once around they shall have advanced a distance about equal to the diameter of the feeding-orifice C, in order that anything fed into the machine would naturally in a single revolution pass beyond the orifice C.

The cylinders or rollers D and E are of such a size as very nearly to fill the space between the cases A and B when closed, and so as to prevent the passing of anything of much size or bulk between the case and the rollers. These cylinders have also a number of spiral grooves, *c c*, running lengthwise, the spiral curve of which may be greater or less as desired or found most convenient. The drawings represent five such grooves upon each cylinder, but the number is merely arbitrary and may be varied as desired. These grooves are also not of uniform size, but vary in depth, as seen in Figs. 1, 4, their depth at one, or, as it may be called, the "front," end, being about equal to the distance from the shaft or axle F to the periphery of the cylinder, and thence gradually diminishing toward the other end, until the bottom of the groove nearly reaches the periphery of the cylinder, as seen in Fig. 4, its distance here being more or less as it may be desired to have the thing cut coarser or finer, as from these ends of the grooves everything is discharged from the machine, and nothing can pass out until cut small enough to pass through these diminished orifices.

From this construction of the cylinders and their grooves it is readily apparent that pieces of meat, &c., while of any largish size, are prevented from passing into the shallowest parts of the grooves and are continually pressed backward and carried by the revolution of the cylinders toward the knife or knives, hereinafter mentioned, and will only be discharged from the machine when cut fine enough to pass out of the apertures *b b*, made by the shallowest ends of the grooves with the surrounding case.

The diminishing of the area of the grooves or spaces between the flanges of the cylinders D and E may also be effected by decreasing the diameters of such cylinders at one end, thus giving them the form of a frustum of a cone, and in such cases making the outer cases to fit to such form, and also in other ways. The particular form and arrangement of the parts are not material so long as this feature of diminishing the sectional area of the grooves or spaces between the flanges is substantially preserved.

The number of grooves and flanges may also be greater at one end of the cylinder than at the other, and the flanges may have a variable twist. The flanges or highest parts of such grooves make at the periphery of such cylinders edges *e e*, which act against the knives referred to with a drawing or shearing cut.

The position of the cylinders D and E in the cases A and B is such that the flanges or edges *e e* will lap a little upon each other, as shown in Figs. 1 and 4, so that the cylinder operated by the crank F will communicate motion to the other without gearing, and thus cause both cylinders to revolve toward the knife placed between them, as hereinafter described, carrying with them by means of the grooves *c c* the article to be cut, and which the depth of the grooves, as before set forth, prevents from passing forward and out of the orifices *b b* until it is sufficiently cut and minced.

Instead, however, of constructing the cylinders with grooves, as described, a shaft or axle may have flanges radiating from it or placed tangentially upon it, which shall act upon the knife H in the same way as the edges *c c*, the spaces between such flanges being so filled, or the depth of the flanges being so diminished, as substantially to secure the taper of the groove above referred to. Nor is the spiral direction of the grooves or edges, as above described, absolutely essential, as their arrangement may be varied by making the flanges of the revolving cylinder parallel to its axis and inclining the edge of the knife, and so adjusting the cylinders as to preserve and secure the benefits and advantages of the shearing-cut of such edges on the knife, as described.

The position of the knife or knives H is shown in Fig. 2, and also an end view in Fig. 4. They extend the length of the cylinders, and rest in a slot or recess in the lower or under case, B, directly between the cylinders, (shown in Fig. 3,) and are of such a height that the edge *h* will be at that point or line where the grooved cylinders leave each other. As these cylinders revolve, therefore, their flanges *e e* will be constantly acting upon the edge of the knife with a drawing or shear cut, thus acting most easily and effectually.

The slot or recess in which the knife or knives rest may be a little tapering on one side, so as to allow the insertion of a small wedge, *f*, Fig. 3, to fasten the knife, or such slot may be of uniform width and broader, with tapering wedges placed on each side of the knife, operated by screws at either end, so that the position of the knife may be adjusted as desired, or such slot may have a width uniform and a little greater than the thickness of the knife, so that the knife may rest in it loosely, its edge being kept in position by contact with the cylinders.

In order to give the edge of the knife the proper position in respect to the cylinders D and E, the ends of the back of the blade are beveled or chamfered, as shown by the dotted lines *f f'*, Fig. 2, against which work screws *g g*, to elevate the knife, as necessary, or the blade may rest upon a small steel or other spring underneath it, or on a strip of rubber or other elastic material, or upon a wedge operated from either end to insure the contact of the edge.

The same principle of operation may be secured by the use of a single revolving cylinder, though, of course, the capacity of the machine will be somewhat less. Such an arrangement is shown in Fig. 6. In such case the ribbed cases and grooved and flanged cylinders will be the same as above described, but the knife H will stand at one side of the cylinder D' and will be supported at its ends, and perhaps at its middle, and the article cut will pass outside of the knife into a cavity or recess, G, cast at one side of the cases for such purpose, and from thence under the knife, and again in contact with the cylinder D', and by it be again carried to the knife. A more rapid operation may be obtained by placing a knife on each side of such cylinder.

By attaching a funnel or stuffer, J, as shown in Fig. 5, to the machine, casings of any kind can be filled at the same time the meat is minced. Without the stuffer the machine is fitted for the ordinary uses of cutting and mincing.

The several parts of the machine may be cast and are at once fit for use, except that the knife may be better rolled out the desired shape and tempered or hardened, and the cylinders may be cast, rolled, or forged. The whole is simple in construction, not liable to get out of order, and every part is easily cleaned and kept sweet for use.

What I claim as my invention, and desire to secure by Letters Patent, is—

1. The use and application of a flanged cylinder or cylinders, having the grooves between such flanges tapering or diminishing in depth, substantially as set forth.

2. The use and application of a cylinder or cylinders having spiral flanges with grooves between them diminishing or tapering in depth, substantially as set forth.

3. The combination of two cylinders with spiral flanges so arranged that the flanges of one cylinder overlap those of the other, so that the cylinder operated by the power or crank will give motion to and rotate the other without the interposition of other gearing.

4. The combination of a cylinder or cylinders having spiral flanges or tapering grooves with a shearing-knife, and a case having spiral ribs on its inner surface, substantially as set forth.

5. The combination of two cylinders or conic frustra having straight or spiral flanges or tapering grooves with a knife or case with or without spiral ribs.

6. The combination of two cylinders having spiral flanges and tapering grooves with a shearing-knife and a case having spiral flanges.

ALBERT W. HALE.

Witnesses:
S. D. LAW,
W. R. RONALDS.